3,305,597
PROCESS FOR THE REMOVAL OF OXYGEN AND ACETYLENIC CONTAMINANTS FROM NORMALLY GASEOUS OLEFINS
Heinrich K. Straschil, East Orange, and Walter Egbert, Jr., West Paterson, N.J., assignors to Engelhard Industries, Inc., Newark, N.J., a corporation of Delaware
No Drawing. Filed Apr. 17, 1964, Ser. No. 360,748
18 Claims. (Cl. 260—677)

This invention relates to the removal of contaminants from a normally gaseous olefin, and more particularly to a process for the removal of oxygen and acetylenic hydrocarbons and, when present, diolefins as contaminants from a normally gaseous olefin, for instance ethylene.

The use of ethylene containing small amounts of oxygen for various chemical processes has been found disadvantageous for the reason the oxygen content results in undesirable side reactions. Consequently, it has been found necessary to remove partially or completely the oxygen. For instance, in the polymerization of ethylene to polyethylene, the presence of small amounts of oxygen has a marked adverse effect upon the polymerization, and the quality of the polyethylene.

Acetylenic hydrocarbons, for instance acetylene and methylacetylene, are also present in olefin streams obtained from the pyrolysis of saturated hydrocarbons or from refining operations, and these acetylenic hydrocarbons are also often undesirable impurities in the olefin gas. Additionally diolefins, for instance propadiene, may also be present as contaminant along with the acetylenic contaminant and oxygen. Removal of the acetylenic contaminant from gaseous olefins by selective hydrogenation is well known with suitable catalysts being Pd or Pd-containing catalysts. However, where $O_2$ is also present as contaminant in addition to the acetylenic hydrocarbon, the removal of both impurities has presented problems as hereinafter mentioned.

Heretofore, attempts to remove either of the $O_2$ and acetylenic hydrocarbon contaminants from an olefin gas stream such as an ethylene gas upstream of the other followed by removal of the remaining contaminant downstream have been unsatisfactory. Where the acetylenic contaminant was removed first, there has been the disadvantage of a short life of the $O_2$-removing catalyst on the downstream side because of increased polymer formation and deposition on the catalyst due to the $O_2$. The use of polymer traps to combat this difficulty is expensive and may also be troublesome. Where the $O_2$ was removed prior to the removal of the acetylene, the result was excessive hydrogenation of the desired ethylene.

In accordance with the present invention, a process is provided for the selective removal of oxygen and acetylenic hydrocarbon contaminants and also diolefins, when present, from a normally gaseous olefin, for instance ethylene, without material hydrogenation of the olefin and without material polymer formation and with an appreciably prolonged life of the catalyst. The process involves passing the normally gaseous olefin containing the oxygen and acetylenic contaminants, for instance acetylene, together with hydrogen present in at least the stoichiometric amount required to react with all of the oxygen and acetylenic contaminants, at a high space velocity over rhodium, rhodium-platinum, or platinum as catalyst to remove the oxygen. The effluent gas from this catalytic contacting is then passed over palladium as catalyst which can be promoted as hereafter disclosed or palladium per se, to remove the acetylenic contaminant. An additional improvement provided by the present process is that it accomplishes the removal of oxygen in the first stage without unnecessary diminution of hydrogen. This is particularly important where it is desired to remove an additional contaminant, such as the acetlyenic hydrocarbons, by hydrogenation in the second stage, inasmuch as it eliminates the requirement of adding more hydrogen to the gas feed to the second stage. Further the total amount of hydrogen required for removal of the undesirable oxygen and acetylenic contaminants is materially reduced by the present invention. Another important advantage is that continuous operation in a single unit or reactor is attained.

The space velocity employed for the first stage contacting is preferably about 60,000 or higher standard volumes of gas per volume of catalyst per hour, and can be as high as 2,000,000 standard volumes of gas per volume of catalyst per hour and higher. Especially good results were attained herein by employing a space velocity for the first stage of 300,000 and higher standard volumes of gas per volume of catalyst per hour. It was entirely unexpected that at such high velocities of contacting, the $O_2$ contaminant could be removed from the olefin gas with great selectivity even though the olefin was present in predominating abundance and the oxygen in relatively small amount. In the second stage of contacting for removal of acetylenic hydrocarbons and, when present, diolefins, the space velocity may be from about 500–25,000 standard volumes of gas per volume of catalyst per hour and higher, preferably from about 500–10,000 standard volumes of gas per volume of catalyst per hour. Space velocities of 300,000 and higher for the first stage removal of oxygen were found herein to be especially desirable for the reason that with such higher space velocities of gas flow, higher temperatures can be utilized for the oxygen removal and with the desired selectivity of oxygen removal than are utilizable at lower space velocities materially below 300,000. The advantage of this is that the first stage contacting for oxygen removal can then be carried out at higher temperatures within the about 100° C.–200° C. range preferred for the second stage, which eliminates the requirement of additional heating of the gas after exiting from the first stage and prior to being introduced into the second stage.

The considerable improvement achieved in the first stage $O_2$ removal by the high space velocities of gas flow of this invention is attributed to the high selectivity of the first stage catalyst for the reaction of the $O_2$ with hydrogen. Competing reactions are possible in the first stage; for instance with an ethylene gas stream containing $O_2$ and $C_2H_2$, the competing reactions of principal concern in the first stage are:

Reaction A

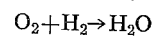

Reaction B

Reaction A of course is the desired reaction because it results in $O_2$ removal, whereas Reaction B undesirably results in a reduced amount of ethylene and an unnecessarily reduced amount of hydrogen which is expensive and needed for the second stage acetylenic hydrocarbon removal. However at the high hourly space velocities of the present invention, the catalysts of the first stage unexpectedly were considerably more selective for Reaction A, whereas at hourly space velocities much below 60,000 such catalysts are appreciably less selective for Reaction A with attendant undesirable reduction of the ethylene content of the gas as well as reducing the available $H_2$ for the second stage reaction with the acetylenic hydrocarbons and diolefins, if present.

Despite the high space velocity of the first stage, the oxygen content of the olefin gas was reduced to extremely low concentrations typically as low as less than 25 parts per million. The $C_2H_2$ content was also reduced to extremely low concentrations typically less than 1 part per million. The thus-purified, substantially oxygen- and acetylenic hydrocarbon-free olefin gas is well suited for use in polymerization processes.

A major portion of the $O_2$ is removed from the gas in the first stage and typically from an $O_2$ content of 1000 p.p.m. down to <25 p.p.m. A portion of the remaining $O_2$ may also be removed in the second stage. A minor amount of acetylenics may be removed in the first stage, but the major portion of the acetylenic hydrocarbons are removed in the second stage and typically from an acetylenic hydrocarbon content in the gas of about 3% by volume down to <1 p.p.m. Similarly, diolefins, e.g. propadiene, if present, are reduced to similar low concentration levels in the olefin gas in the second stage.

The temperatures for the catalytic contacting in the first stage are preferably from room temperature to about 200° C., more preferably from about 100° C.–200° C. Although temperatures above 200° C. can be used, they are not preferred for the reason ethylene tends to be hydrogenated at the higher temperature. A pressure of from atmospheric pressure to 600 p.s.i.g. and higher may be utilized for the first stage. For the second stage catalytic contacting temperatures from about 100° C.–200° C. are preferably employed, and pressures are utilized which are similar to those of the first stage. Less preferably temperatures of from about 50° C. and up to about 200° C. can be utilized in the second stage.

The catalysts for the first stage are preferably supported on solid carriers. Exemplary of such carriers are refactory metal oxides, e.g. alumina, zirconia, thoria and mixtures thereof. The catalytic metal may be present on the carrier in the amount, by weight, from about 0.01%–10%, preferably from about 0.1%–2% by weight( based on total catalyst). A preferred rhodium-platinum catalyst is a mixture of rhodium and platinum containing, by weight, about 0.1–1 percent of rhodium metal and about 0.1–1 percent of platinum metal (based on total supported catalyst) on the support or carrier. The carrier can be in the form of spheres, granules, pellets, extruded shapes, etc. Alumina is the preferred carrier.

The promoted palladium catalysts for the second stage contain palladium and a promoter metal, e.g., rhodium, ruthenium, gold, silver, copper or iron. The palladium content of the catalyst will preferably range, by weight, from about 0.001 percent to about 1 percent, more preferably from about 0.001 percent to about 0.035 percent (based on total catalyst). The promoter metal is preferably present in amount within the range from about 0.001 percent–5 percent by weight of the palladium. The promoted and unpromoted catalysts for the second stage are also preferably supported on solid carriers, with the refractory metal oxides previously disclosed as carriers for the first stage catalysts being exemplary, and the alumina preferred. The carrier for the second stage catalyst can also be of the various shapes or forms disclosed for the first stage carrier.

The supported catalysts of the first and second stages can be prepared in manner known to the art, for instance by treating by immersing or otherwise the carrier or support with an aqueous solution of a salt or salts of the metal or metals, and then reducing the salt or salts on the carrier to the metal. Either a combined solution of the salts of the two metals or separate solutions with treatment of the carrier first with one solution and then the other can be used when preparing the catalyst containing two metals.

The catalyst for each stage is preferably in a fixed bed, although a fluidized bed could be utilized if desired. The catalyst for both stages are preferably in the same reactor but, if desired or required, may be in separate reactors. When in the same reactor, the two stages can be adjacent or spaced an appreciable distance apart depending on the engineering requirements of the system.

The oxygen is typically present in the normally gaseous olefin, ethylene, in amount of about 400–1000 p.p.m., and the acetylene is typically present therein in amount of about .1%–3% by volume. The diolefin, propadiene, when present in the olefin, is typically present therein in amount of about 1%–2% by volume. These impurities may be present in propylene or in mixtures of ethylene and propylene in similar amounts. The process of this invention is especially well suited for the selective removal of oxygen, acetylenic hydrocarbons and, when present, diolefins from 2–3C olefin streams (i.e. ethylene or propylene and mixtures thereof) containing, by volume, about 80% or higher of the ethylene or propylene or mixtures thereof.

The hydrogen is present in the olefin feed gas to the first stage either originally or by addition of $H_2$ thereto completely or in part. Preferably the hydrogen is present in the olefin feed gas to the first stage in amount of about two to five times the stoichiometric amount required to react with all of the oxygen and acetylenic hydrocarbon contaminants and also the diolefins, for instance propadiene, when present. The reaction for the first stage removal of oxygen is: $O_2+2H_2 \rightarrow 2H_2O$; whereas the second stage reaction for removal of acetylene is: $C_2H_2+H_2 \rightarrow C_2H_4$, for the removal of methylacetylene is: $CH_3-C \equiv CH+H_2 \rightarrow CH_3-CH=CH_2$, and, when present, for the removal of the diolefin, propadiene, is: $CH_2=C=CH_2+H_2 \rightarrow CH_3-CH=CH_2$.

An example of the $H_2$ being present in the gas at the outset is the gas mixture obtained from the known process of manufacturing ethylene by cracking saturated hydrocarbons, for instance the propane and butane present in natural gas. The product gas mixture contains hydrogen as well as ethylene and acetylene and there is a tendency also for small amounts of oxygen to be present therein, for instance due to leaks at pipe joints or by being present in insufficiently purged vessels containing air into which the ethylene-containing gas may be passed for storage, etc.

The invention will be more fully understood by reference to the following examples. In the examples the feed gas contained primarily ethylene and the small amounts specified of oxygen and acetylene as impurities, and also hydrogen. Space velocities of feed gas were varied for each example and different catalysts were employed in each of two spaced apart stages or compartments of the reactor. The pressure employed for each example was 450 p.s.i.g., and the feed gas for each example contained, by volume, 0.8% $C_2H_2$, about 400 p.p.m. $O_2$, 2.8% $H_2$, and the balance $C_2H_4$.

The results follow:

| Example | Running Time (Hours) | First Stage | | | | Second Stage | | | |
|---|---|---|---|---|---|---|---|---|---|
| | | Catalyst | °C., Temperature | Space Velocity, v./v./h. | Effluent Gas | Catalyst | °C., Temperature | Space Velocity | Effluent Gas |
| 1 | 1 | 0.1% Rh +0.4% Pt on 1/8" $Al_2O_3$ spheres. | 25 | 80,000 | 24 p.p.m. $O_2$, 2.3% $H_2$. | | | | |
| | 4 | ----do---- | 40 | 300,000 | 24 p.p.m. $O_2$, 2.3% $H_2$. | | | | |
| | 6 | ----do---- | 110 | 300,000 | 20 p.p.m. $O_2$, 1.75% $H_2$. | | | | |
| | | | | | SECOND STAGE ADDED | | | | |
| | 6.5 | ----do---- | 110 | 300,000 | 20 p.p.m. $O_2$, 1.75% $H_2$. | 0.00125% Pd on $Al_2O_3$ spheres. | 106 | 4,500 | 15 p.p.m. $C_2H_2$, 17 p.p.m. $O_2$. |
| | 25 | ----do---- | 104 | 60,000 | 24 p.p.m. $O_2$, .96% $H_2$, .57% $C_2H_2$. | ----do---- | 137 | 4,500 | 164 p.p.m. $C_2H_2$, 8.5 p.p.m. $O_2$. |
| | 26 | ----do---- | 104 | 300,000 | 20 p.p.m. $O_2$, 1.98% $H_2$, .78% $C_2H_2$. | ----do---- | 137 | 22,500 | 17 p.p.m. $C_2H_2$, 17 p.p.m. $O_2$. |
| | | | | | RUN TERMINATED | | | | |
| 2 | 3 | .00125% Pd on $Al_2O_3$. | 200 | 4,500 | 150 p.p.m. $O_2$ | 0.5% Pd on $Al_2O_3$. | 200 | 22,500 | 94 p.p.m. $O_2$, <200 p.p.m. $H_2$. |
| | | | | | RUN TERMINATED | | | | |
| 3 | 4 | 0.1% Rh +0.4% Pt on 1/8" $Al_2O_3$ spheres. | 130 | 810,000 | 20 p.p.m. $O_2$, 1.94% $H_2$, .79% $C_2H_2$. | .00125% Pd on $Al_2O_3$ spheres. | 130 | 4,000 | <1 p.p.m. $C_2H_2$, 20 p.p.m. $O_2$. |
| | 6 | ----do---- | 130 | 810,000 | 20 p.p.m. $O_2$, 1.94% $H_2$, .79% $C_2H_2$. | ----do---- | 130 | 4,000 | <1 p.p.m. $C_2H_2$, 20 p.p.m. $O_2$. |
| | 31 | ----do---- | 130 | 810,000 | 20 p.p.m. $O_2$, 1.94% $H_2$, .79% $C_2H_2$. | ----do---- | 130 | 4,000 | <1 p.p.m. $C_2H_2$, 20 p.p.m. $O_2$. |
| | 56 | ----do---- | 130 | 810,000 | 20 p.p.m. $O_2$, 1.94% $H_2$, .79% $C_2H_2$. | ----do---- | 130 | 4,000 | <1 p.p.m. $C_2H_2$, 20 p.p.m. $O_2$. |
| | | | | | RUN TERMINATED | | | | |
| 4 | 2 | 0.3% Pt on $Al_2O_3$ spheres. | 25 | 22,500 | 35 p.p.m. $O_2$, 2.4% $H_2$. | | | | |
| | 4.5 | ----do---- | 25 | 30,000 | 32 p.p.m. $O_2$, 2.5% $H_2$. | | | | |
| | 5 | ----do---- | 25 | 75,000 | 30 p.p.m. $O_2$, 2.65% $H_2$. | | | | |
| | | | | | RUN TERMINATED | | | | |

The superior removal of $O_2$ from the gas at the higher space velocities of about 60,000 or higher standard volumes of gas per volume of catalyst per hour is shown by the data of the foregoing table. Thus Example 1 in the table shows a reduction of $O_2$ in the gas stream from about 400 parts per million to 24 parts per million at the high hourly space velocity of 80,000. The $H_2$ content of the stream was reduced only from 2.8% to 2.3% showing that only little of the competing hydrogenation reaction took place. Good selective removal of $O_2$ down to 20 parts per million was achieved at hourly space velocities as high as 810,000, as shown by Example 3 of the data table. The upper limit of space velocity of 810,000 of the table was merely the limit of the equipment and hourly space velocities up to 2,000,000 and higher could be utilized with different equipment. However, with an hourly space velocity of only 4500 in Example 2 of the table, much less of the $O_2$ was removed from the gas and only down to 150 parts per million. The data of the table also shows the good removal of acetylene from the gas in the second stage and down to less than 1 part per million of $C_2H_2$ in Example 3. "V./v./h." in the Space Velocity column heading in the table means standard volumes of gas per volume of catalyst per hour, for instance standard cubic feet of gas per cubic foot of catalyst per hour.

When desired to remove only oxygen from the normally gaseous olefin containing the oxygen as an impurity or contaminant, the second stage of the process is omitted. Thus, in this event, the normally gaseous olefin containing the oxygen is passed together with hydrogen at a space velocity of about 60,000 or higher, and which may be as high as 2,000,000 standard volumes of gas per volume of catalyst per hour and even higher, over the rhodium, rhodium-platinum or platinum, thereby to remove the oxygen from the gas. The hydrogen is present in the gas feed in a stoichiometric excess over the amount required to react with all the oxygen, with the preferred stoichiometric excess of hydrogen and the other reaction conditions being similar to those previously disclosed herein with regard the first stage contacting of the two stage process, except in this embodiment a reaction temperature below room temperature may be utilized, if desired, and the reaction temperature may range from about —50° C. to about 200° C.

What is claimed is:

1. A process for the removal of oxygen and acetylenic hydrocarbon contaminants from a normally gaseous olefin, which comprises passing the normally gaseous olefin together with hydrogen present in a stoichiometric excess over the amount required to react with all the oxygen and acetylenic hydrocarbons, at a high space velocity over a catalyst of the group consisting of rhodium, rhodium-platinum and platinum to remove the oxygen from the gas, and then passing the gas from the catalyst over a palladium catalyst at a reaction temperature to remove the acetylenic hyrocarbons therefrom.

2. The process of claim 1 wherein the space velocity of the gas passed over the first mentioned catalyst is at least about 60,000 standard volumes of gas per volume of catalyst per hour.

3. The process of claim 2 wherein the space velocity of the gas is from about 60,000–2,000,000 standard volumes of gas per volume of catalyst per hour.

4. The process of claim 2 wherein the normally gaseous olefin is ethylene.

5. The process of claim 2 wherein the normally gaseous olefin is propylene.

6. The process of claim 2 wherein the first-mentioned catalyst is rhodium.

7. The process of claim 2 wherein the first-mentioned catalyst is rhodium-platinum.

8. The process of claim 2 wherein the last-mentioned catalyst is palladium promoted with a metal from the group consisting of rhodium, ruthenium, gold, silver, copper and iron.

9. The process of claim 2 wherein the last-mentioned catalyst is palladium per se.

10. The process of claim 2 wherein the first- and last-mentioned catalysts are each supported on a solid carrier.

11. The process of claim 10 wherein the carrier is alumina.

12. The process of claim 2 wherein the hydrogen is present together with the gaseous olefin in a stoichiometric excess of about two to five times the amount required to react with all the oxygen and acetylenic hydrocarbons.

13. The process of claim 2 wherein the catalytic removal of the oxygen is effected at a temperature from about room temperature–200° C., and the reaction temperature for the catalytic removal of the acetylenic hydrocarbons is from about 100° C.–200° C.

14. The process of claim 13 wherein a space velocity of the gas of at least 300,000 standard volumes of the gas per volume of catalyst per hour and a reaction temperature in the range of about 100° C.–200° C. is utilized for the catalytic oxygen removal, whereby the temperature of the effluent gas from the catalytic oxygen removal is about that preferred for the subsequent catalytic removal of acetylenic hydrocarbons.

15. A process for the removal of oxygen, acetylenic hydrocarbons and diolefin contaminants from a normally gaseous olefin having 2–3 carbon atoms per molecule, which comprises passing the normally gaseous olefin together with hydrogen present in a stoichiometric excess over the amount required to react with all of the oxygen, acetylenic hydrocarbons and diolefins at a space velocity of at least about 60,000 standard volumes of gas per volume of catalyst per hour over a catalyst of the group consisting of rhodium, rhodium-platinum and platinum to remove the oxygen from the gas, and then passing the gas from the catalyst over a palladium catalyst at a reaction temperature to remove the acetylenic hydrocarbons and diolefins therefrom.

16. A process for the removal of oxygen from a normally gaseous olefin, which comprises passing the normally gaseous olefin together with hydrogen present in a stoichiometric excess over the amount required to react with all the oxygen at a space velocity of at least about 60,000 standard volumes of gas per volume of catalyst per hour over a catalyst of the group consisting of rhodium, rhodium-platinum and platinum to remove the oxygen from the gas.

17. The process of claim 16 wherein the normally gaseous olefin is ethylene.

18. The process of claim 16 wherein the space velocity of the gas is from about 60,000–2,000,000 standard volumes of gas per volume of catalyst per hour.

References Cited by the Examiner

UNITED STATES PATENTS

| | | | |
|---|---|---|---|
| 2,359,759 | 10/1944 | Hebbarb et al. | 260—677 |
| 2,802,889 | 8/1957 | Frevel et al. | 260—677 |
| 2,836,635 | 5/1958 | Gothel et al. | 260—677 |
| 2,981,768 | 4/1961 | Frevel et al. | 260—677 |
| 3,068,303 | 12/1962 | Pattison | 260—677 |
| 3,218,268 | 11/1965 | Arnold | 260—677 |
| 3,243,387 | 3/1966 | Blume et al. | 260—677 |

ALPHONSO D. SULLIVAN, *Primary Examiner.*